United States Patent [19]

Barber

[11] Patent Number: 4,623,528

[45] Date of Patent: Nov. 18, 1986

[54] RECOVERY OF FLUORINE FROM WASTE GASES

[75] Inventor: James C. Barber, Florence, Ala.

[73] Assignee: James C. Barber and Associates, Inc., Florence, Ala.

[21] Appl. No.: 745,648

[22] Filed: Jun. 17, 1985

[51] Int. Cl.$^4$ ............................................. C01B 25/01
[52] U.S. Cl. ..................................... 423/320; 71/34; 423/167; 423/240
[58] Field of Search ................. 423/167, 240 R, 317, 423/320; 71/34

[56] References Cited

U.S. PATENT DOCUMENTS

| | | | |
|---|---|---|---|
| 2,753,253 | 7/1956 | Hollingsworth | 423/167 |
| 3,323,864 | 6/1967 | Lapple | 423/167 |
| 3,498,747 | 3/1970 | Smaltz et al. | 423/320 |
| 3,567,376 | 3/1971 | Satterwhite et al. | 423/320 |
| 3,743,725 | 7/1973 | Case | 423/320 |
| 3,795,728 | 3/1974 | Scheel | 423/320 |
| 4,060,586 | 11/1977 | Sardisco et al. | 423/320 |
| 4,191,734 | 3/1980 | Drechsel et al. | 423/320 |

OTHER PUBLICATIONS

Slack, Phosphoric Acid, vol. 1, Part II (1968), Marcel Dekker, Inc.

Primary Examiner—John Doll
Assistant Examiner—Wayne A. Langel

[57] ABSTRACT

Fluorine in phosphate ores is present as the mineral fluorapatite. When the ores are digested with sulfuric acid a slurry is formed which can be filtered to make wet-process phosphoric acid. But fluorine compounds are discharged into the surrounding air during digestion and filtration. The fluorine-containing air is scrubbed with water to prevent air pollution. Scrubber water is cooled in ponds and is recycled to the scrubber. However, fluorine compounds are emitted from the cooling ponds and cause air pollution. In the present invention, processes are disclosed for treating fluorine-containing gases without use of cooling ponds thereby eliminating the air pollution problem. A facility is provided for treating fluorine-containing gases wherein fluosilicic acid or fluosilicate salts are converted to a fluoride salt by the addition of an alkaline substance. A slightly acidic scrubber water is concentrated in an absorption tower. When the scrubber water contains nutrients, ammonium is the preferred alkaline substance and the scrubber water is recovered in solid ammonium phosphate fertilizers or in suspension fertilizers. Sodium hydroxide or sodium carbonate are the preferred alkaline substances when sodium cryolite or aluminum fluoride are produced.

14 Claims, 1 Drawing Figure

RECOVERY OF AMMONIUM FLUORIDE SOLUTION FROM A GASEOUS MIXTURE
OF SILICON TETRAFLUORIDE AND HYDROGEN FLUORIDE

RECOVERY OF AMMONIUM FLUORIDE SOLUTION FROM A GASEOUS MIXTURE OF SILICON TETRAFLUORIDE AND HYDROGEN FLUORIDE

RECOVERY OF FLUORINE FROM WASTE GASES

BACKGROUND OF THE INVENTION

In U.S. Pat. No. 4,383,847, processes are disclosed for making suspension fertilizers wherein a liquid waste from the production of elemental phosphorus is incorporated in fertilizer mixtures. In this case the liquid waste is bleedoff water from phosphorus condensing systems at phosphorus furnaces, and the waste contains elemental phosphorus.

In the production of wet-process phosphoric acid, a liquid waste is obtained which is a solution of phosphoric and fluosilicic acids. This is called pond water. The phosphoric acid has value as a nutrient in making fertilizers; this acid is used to make orthophosphate suspension fertilizers and solid ammonium phosphate fertilizers. Fluorides prevent the formation of large crystals of ammonium phosphate when orthophosphate suspension fertilizers are produced. Therefore the quality of the suspension fertilizer is improved by the presence of fluorides. Suspension fertilizers can be prepared by dissolving monoammonium phosphate and diammonium phosphate in water. The quality of the suspension fertilizer made by this method is improved by incorporating fluorides in the mixture. However, pond water is not suitable for use in making fertilizers for the following reasons.

1. The concentration of phosphoric acid in pond water is too low for recovery in either suspension fertilizer or solid ammonium phosphates.

2. Fluorine is present in pond water as fluosilicic acid instead of fluoride.

The present invention discloses a process for the production of wet-process phosphoric acid wherein a liquid waste is obtained which contains fluorides instead of fluosilicic acid. Also, the concentration of nutrient phosphorus in the waste is about 10 times greater than it is in pond water. The concentrated waste can be used to make fertilizers and the fluorides will improve the quality of suspension fertilizers.

The present invention is not limited to the recovery of fluorine compounds in the waste gases at wet-process phosphoric acid plants. The fluorine compounds in other waste gases can be recovered by the processes disclosed herein. Nevertheless, technology for the abatement of air pollution at wet-process phosphoric acid plants is emphasized to explain the disclosed processes.

Wet-process phosphoric acid is produced by digesting finely ground phosphate ore with sulfuric acid forming a slurry. The slurry is comprised of phosphoric acid, material insoluble in sulfuric acid, and calcium sulfate—a byproduct of the acid digestion. The slurry is filtered to separate the liquid and solid phases. The filtrate is dilute phosphoric acid which contains about 32 percent $P_2O_5$ and is called filter-grade acid. Filter cake is a mixture of calcium sulfate and material insoluble in sulfuric acid, called byproduct gypsum. Filter-grade acid is generally concentrated by vacuum evaporation to about 54 percent $P_2O_5$, and this acid is called merchant-grade wet-process phosphoric acid, commonly used to make fertilizers.

Phosphate ores are mineral apatites which contain both phosphorus and fluorine. The ores digested to make wet-process phosphoric acid are beneficiated and the apatite content is in the range of 80 to 90 percent. The basic mineral in phosphate ores is flurapatite—$Ca_{10}(PO_4)_6F_2$—and it has a theoretical $F:P_2O_5$ weight ratio of 0.089. However, fluorapatite is modified in most phosphate ores whereby carbonate and fluorine are substituted for phosphate, and some calcium is replaced by other metals. The $F:P_2O_5$ ratio is generally higher than 0.089. Fluorine present in excess of that needed for a $F:P_2O_5$ ratio of 0.089 is more readily volatilized than the fluorine associated with $P_2O_5$ in the fluorapatite molecule. The degree of fluorapatite modification affects the quantity of fluorine volatilized when phosphate ores are processed.

The phosphate ores mined in Florida have a $F:P_2O_5$ weight ratio in the range of 1.1 to 1.4. Most of the wet-process phosphoric acid produced in the U.S. is made from this ore. The fluorine distribution data given in table 1 may be considered typical when wet-process phosphoric acid is produced by the dihydrate method with atmospheric pressure digestion.

TABLE 1

Distribution of Fluorine when Wet-Process Phosphoric Acid is Produced from Florida Phosphate Ore

| Source of fluorine | Percent of total F in phosphate ore |
|---|---|
| Reactor vapors | 6 |
| Byproduct gypsum | 24 |
| Evaporator vapors | 41 |
| Merchant-grade phosphoric acid | 29 |
| Total | 100 |

The gases discharging from the digester and filter are called reactor vapors and, as shown in table 1, 6 percent of the fluorine is volatilized in these vapors. The fluorine volatilizes into the surrounding air. A large volume of air must be collected by ventilating equipment to prevent fluorine from escaping and causing both air pollution and occupational health problems. The collected air has a low concentration of fluorine, but air pollution regulations are based on quantities emitted. About 99.8 percent of the fluorine in the collected air must be removed to meet air pollution emission standards.

About 24 percent of the fluorine remains in the byproduct gypsum. The quantity of byproduct gypsum made is four to five times the quantity of $P_2O_5$ produced as acid. Practical uses or disposal methods have not been developed, and large piles of the material accumulate as solid waste.

Vapors from the evaporator contain about 41 percent of the fluorine in the phosphate ore. The fluorine from this source is prevented from being discharged in the air by condensation and water scrubbing wherein a 20 to 25 percent fluosilicic acid solution is recovered. Fluosilicic acid may be solid as a byproduct to fluoridate potable water, and several processes are known for making cryolite and aluminum fluoride from the fluosilicic acid. Cryolite and aluminum fluoride are used in the aluminum industry.

About 29 percent of the fluorine remains in the merchantgrade wet-process phosphoric acid. Part of the fluorine is volatilized when the phosphoric acid is neutralized to make ammonium phosphate fertilizers—monoammonium phosphate and dicalcium phosphate. Fluorine emitted when ammonium phosphates are produced can be recovered by the processes disclosed in the present invention.

The 6 percent of fluorine in the reactor vapors is considered in the present application. The fluorine compounds in the collected air are removed by scrubbing with water, and a typical arrangement of equipment is as follows.
1. Venturi scrubber to remove particulates.
2. Water sprays in gas duct downstream from the venturi scrubber.
3. Cross-flow scrubber.
4. Entrainment collector.

Water used in the scrubber system comes from ponds located on the pile of byproduct gypsum. The water is recirculated from the ponds to the scrubber system. Fluorine and phosphorus compounds collect in the pond water, resulting in the formation of a dilute solution of a mixture of fluosilicic and phosphoric acids. The pond water contains 2,000 to 8,000 ppm of F, present as fluosilicic acid, and about the same range of concentrations of $P_2O_5$ as phosphoric acid. The pH of pond water is in the range of 1 to 3.

Fumes from the digester and filter contain $P_2O_5$ as entrained particles of phosphoric acid and as particles of unreacted phosphate ore entrained in the air as dust. The entrained particles are removed when the air is treated in the fluorine scrubber system. Equipment washouts are another source of $P_2O_5$ in the pond water. Washout water is added to pond water to avoid aqueous pollution problems. A favorable water balance can be maintained by evaporating water vapor in the scrubber and by evaporation from the pond. But the water balance may be upset by accumulation of water in the pond from rainfall. When it is necessary to discharge excess pond water, double liming of the effluent is necessary to remove fluorine and $P_2O_5$ to meet regulations for water pollution abatement. Double liming of large quantities of water is costly.

The water balance in the scrubber system may be upset by the use of water in grinding phosphate ore. Wet grinding consumes less energy than dry grinding, and less dust is emitted in the air when the ore is ground wet. Larger quantities of water could be evaporated at the scrubber and from the ponds by increasing the pond water temperature, but air pollution standards are not met when the scrubber water temperature exceeds about 95° F. Furthermore, little control can be exercised over the pond water temperature but the temperature is controlled by the weather. In the summertime it is difficult to keep the pond water temperature below 95° F.

Scrubber water is recirculated to the ponds for cooling. Fluorine is emitted because of the vapor pressure of fluorine over fluosilicic acid solution in the ponds. Furthermore, fluorine may be generated in the pond by the reaction between collected particles of phosphate ore and phosphoric acid represented by the following reaction.

$$Ca_{10}(PO_4)_6F_2 + 14H_3PO_4 10H_2O = 10CaH_4P_2O_8 \cdot H_2O + 2 HF$$

The hydrofluoric acid formed is a volatile compound and it may be discharged in the air at ponds. Hydrofluoric acid may react with silica to form volatile silicon tetrafluoride. The reaction between silica and hydrofluoric acid is represented by the following equation.

$$SiO_2 + 4HF = SiF_4 + 2H_2O$$

The quantity of fluorine emitted from the cooling pond is difficult to measure accurately, but various investigators have reported rates in the range of 0.4 to 20 pounds F per acre of pond surface per day. It is generally recognized that under certain atmospheric conditions, fluorine emissions from the pond can be an environmental hazard and solutions to this environmental problem were not known previously.

Phosphate ores contain sodium and potassium compounds. Phosphate dust is collected in pond water, and some sodium and potassium compounds will be constituents of the scrubber water. These alkali metals combine with fluosilicic acid to form insoluble sodium and potassium fluosilicates. These salts precipitate as tenacious scales on scrubber packing, entrainment separators, and in pumps causing operating delays for removal. Absorption tower packing is sometimes avoided because of the problem of scale deposits, whereas more effective fluorine removal could be realized if the scrubbing system could be operated with efficient tower packing.

OBJECTS OF THE INVENTION

The objects can be summarized as follows.

1. To provide processes for the production of wet-process phosphoric acid wherein the recovery of $P_2O_5$ is increased. This object is achieved by the recovery of the $P_2O_5$ in fertilizers.

2. To abate fluorine pollution by the removal of fluorine compounds from waste gas streams.

3. To convert fluosilicic acid and fluosilicate salts in scrubber water to hydrofluoric acid or to a fluoride salt. This object is achieved by increasing the pH of scrubber water to 8.5, or higher.

4. To utilize fluorides in wastewater to improve the quality of liquid fertilizers.

5. To prevent the formation of scales on the internals of absorption towers used to remove fluorine compounds from waste gases.

6. To eliminate cooling ponds at plants producing wetprocess phosphoric acid.

7. To decrease emission of fluorine in air at plants producing wet-process phosphoric acid.

The technology to achieve the objects of the present invention will be disclosed below.

DISCLOSURES IN THE INVENTION

The technical paper enclosed with this application discloses processes for disposing of condenser waste from phosphorus furnaces in suspension fertilizers. When the wastewater is used in making the fertilizers, ammonia and $P_2O_5$ are recovered. Most of the fluorine in the wastewater is present as ammonium fluoride, and fluorine in this form improves the quality of the suspension fertilizer. However, the technology is not applicable to pond water collected at phosphoric acid plants. Fluorine in pond water is present as fluosilicic acid solution and the concentrations of F and $P_2O_5$ are not large enough to dispose of the waste in suspension fertilizer. The concentrations should be increased by a factor of about 10.

Wastewater from wet-process phosphoric acid plants can be recovered in solid ammonium phosphate fertilizers, although this alternative was not considered for the disposal of phosphorus condenser waste. A preneutralizer would be required instead of a suspension fertilizer facility, but the investment cost for a preneutralizer is only about 9 percent as much as it is for suspension fertilizer.

Solid ammonium phosphate fertilizers—monoammonium phosphate, diammonium phosphate, and ammonium polyphosphate—are soluble in water and can be dissolved in water to make base suspension fertilizers. The practice is to transport the dry materials to liquid fertilizer distribution areas where the solids are converted into fluid fertilizers by adding water, ammonia, and suspending clay when the solid material is monoammonium phosphate fertilizer. Phosphoric acid is also added when the solid material is diammonium phosphate fertilizer. Neutralization of the phosphoric acid with ammonia generates heat needed to increase the temperature of the mixture and increase the rate of solution of this diammonium phosphate. When the solid ammonium phosphate fertilizers contain fluoride salts the quality of the base suspension fertilizer is improved. Large crystals of ammonium phosphate are not formed, thereby eliminating the problem of the separation of large crystals during transit.

The pond water used as a scrubbing medium at wet-process phosphoric acid plants is acidic and it is a mixture of phosphoric and fluosilicic acids. The vapor pressure of fluorine in such acid solutions is greater than it is in solutions neutralized with ammonia. A neutralized scrubbing medium with its lower fluorine vapor pressure is more effective for the absorption of fluorine compounds than are acidic solutions. Heretofore, the cost of neutralizing the scrubbing medium has been prohibitive.

A process is disclosed for neutralizing the scrubbing medium with an alkaline substance wherein the salt formed is a nutrient. Four alkaline substances have been considered as neutralizing agents; they are anhydrous ammonia, aqua ammonia, potassium hydroxide and potassium carbonate. Anhydrous ammonia and aqua ammonia are commonly used to neutralize fertilizer acids such as phosphoric, nitric, and sulfuric, and the resulting salt is a fertilizer. The scrubbing medium at fluorine scrubbers can be neutralized with ammonia and no cost is incurred for the neutralizing agent when the spent scrubber water is used in fertilizers. Fluorine compounds in waste gases can be effectively removed with no costs incurred for neutralizing agent.

The alkaline potassium compounds—potassium hydroxide and potassium carbonate—are used in making mixed fertilizers when chloride-free fertilizers are required. Potassium chloride is the common potassium compound used in fertilizers but some crops are unable to tolerate chlorides. The costly alkaline potassium compounds can be economically used to neutralize the scrubbing medium when the spent scrubber water is to be used to make chloride-free fertilizers.

Fluorine is discharged as gaseous compounds during the digestion of phosphate ore to produce wet-process phosphoric acid. The compounds are HF and $SiF_4$. The $SiF_4$ hydrolyzes to fluosilicic acid with precipitation of $SiO_2$ as shown below.

$$3SiF_4 + 2H_2O = 2H_2SiF_6 + SiO_2.$$

Hydrous silica precipitates. The HF gas is absorbed in scrubber water to form hydrofluoric acid solution, and the hydrofluoric acid solution may react with the precipitated $SiO_2$ to form $SiF_4$, as indicated below.

$$SiO_2 + 4HF = SiF_4 + 2H_2O.$$

The $SiF_4$ thus formed hydrolyzes to form fluosilicic acid and $SiO_2$ precipitates. Also, $SiF_4$ gas may react with hydrofluoric acid to form fluosilicic acid as indicated by the following equation.

$$SiF_4 + H_2F_2 = H_2SiF_6.$$

Most of the fluorine in pond water is fluosilicic acid ($H_2SiF_6$) formed as a result of the series of reactions given above.

A process is disclosed to convert fluosilicic acid to the fluoride salt in a reactor which is an integral part of the scrubbing system. Fluosilicic acid in the scrubber water is reacted with an alkaline substance and the reaction with ammonia is illustrated below.

$$H_2SiF_6 + 6NH_3 + 2H_2O = 6NH_4F + SiO_2.$$

A fluoride salt is formed when the fluosilicic acid is reacted with an alkaline substance at a pH of 8.5, or higher. Fluorine-containing gas can be treated with aqua ammonia or with anhydrous ammonia and water to form ammonium fluoride. Alkaline sodium and potassium compounds will form sodium and potassium fluorides in reacting with fluosilicic acid. The acidic fluorine compounds are efficiently removed from the gas stream by the alkaline scrubbing medium because the vapor pressure of fluorine in the scrubber water is low. The vapor pressure of ammonia is high in alkaline solutions and large ammonia losses will be incurred. However, disclosure includes an absorption tower downstream from the reactor, and the scrubbing medium is a solution of a fluoride salt having a pH in the range of 5.5 to 6.0. Ammonia is recovered in the absorption tower and the absorption tower serves as a cleanup for fluorine gases.

The following steps are therefore included in the process disclosed in the present invention.

1. Contact gases containing fluorine with sprays of alkaline solution at a pH of 8.5 or higher in an open-chamber reactor.

2. Treat the gas in an absorption tower with a solution of a fluoride salt at a pH in the range of 5.5 to 6.0.

3. Remove entrained particles from the gas in an entrainment separator.

Fluosilicic acid or fluosilicate salts are converted to the fluoride salt in the reactor. Consequently, insoluble fluosilicate compounds are not present to deposit in the absorption tower packing or in the internals of the entrainment separator. Most of the fluorine compounds are removed in step 1, but step 2 serves as a cleanup for these compounds. When ammonia is the alkaline substance in step 1, ammonia will enter the gas stream and will be absorbed in step 2. The entrainment separator can be operated at high efficiency if insoluble fluosilicate salts are not present to form deposits.

Effluent from step 1 is a slurry containing precipitated silica, and the slurry is clarified in accordance with the disclosure. The underflow containing precipitated silica can be added to suspension fertilizers or it can be added to a preneutralizer at an ammonium phosphate production facility. Overflow from the clarifier is transported to an adjusting tank and it is used as the scrubbing medium in the absorption tower. The scrubbing medium is recirculated to the absorption tower and a stream of the liquid is bled off to control the concentration of dissolved salts. When the alkaline substance is a nutrient, the liquid bled off can be used to make suspension fertilizers or it can be added to a preneutralizer at an ammonium phosphate production unit.

Heat energy from the neutralization of an acid with an alkaline substance in the adjusting tank results in the evaporation of water in the absorption tower. The scrubbing medium is thereby concentrated. The addition of both acid and an alkaline substance to the adjusting tank releases heat to concentrate the scrubbing medium but the pH is adjusted to the range of 5.5 to 6.0.

When the bleedoff solution is to be disposed of in fertilizers, the preferred alkaline substance is ammonia and the preferred acid is phosphoric. Both of these chemicals are commonly combined in making compound fertilizers.

A further disclosure relates to the use of fluoride scrubber water as a source of fluorine to make sodium cryolite and aluminum fluoride. Fluorine-containing gases can be reacted with an alkaline substance to convert fluosilicic acid or fluosilicate salt to the fluoride salt, as described above. In this case the preferred alkaline substances are solutions of sodium hydroxide or sodium carbonate and the resulting slurry is a solution of sodium fluoride and precipitated silica. The silica can be separated from the solution by filtration wherein the filter cake would be discarded as a solid waste.

The pH of the filtrate is adjusted to the range of 5.5 to 6.0 in an adjusting tank by the addition of an acid and an alkaline substance. The preferred acid is sulfuric and the preferred alkaline substances are solutions of sodium hydroxide and sodium carbonate. Solution in the adjusting tank is heated by neutralization of the acid and alkaline substance and the sodium fluoride solution is used as scrubber water in an absorption tower. The scrubber water is adiabatically cooled in the absorption tower wherein evaporation occurs and the solution is concentrated.

Scrubber water is recirculated from the adjusting tank to the absorption tower and a stream is bled off to use in making sodium cryolite and aluminum fluoride.

DESCRIPTION OF THE DRAWING

The drawing in the present application is a diagram illustrating the process to recover fluorine from a gas mixture. The gas mixture is shown as 1 and this mixture flows into reactor 2. Ammonia 3 is added and water 4 is sprayed into reactor. Amorphous silica precipitates in the reactor and a mixture of ammonium fluoride solution and amorphous silica is discharged from reactor 2 through line 5 into clarifier 6. The amorphous silica is separated from the solution and it is discharged from the clarifier through line 7. Ammonium fluoride solution flows through line 8 into adjusting tank 9. Ammonia 3 and phosphoric acid 10 are added to adjusting tank 9 in proportions needed to adjust the pH of the solution to the range of 5.5 to 6.0. Solution in the adjusting tank flows through line 11 to absorption tower 15 where it is used to absorb fluorine compounds and ammonia in gas flowing into the absorption tower through line 12. Scrubber water leaves absorption tower through line 13 and is recycled to adjusting tank 9. A stream of the scrubber water is bled off at 14. Said bleedoff is a solution containing ammonium fluoride and ammonium phosphate.

Figure 1:
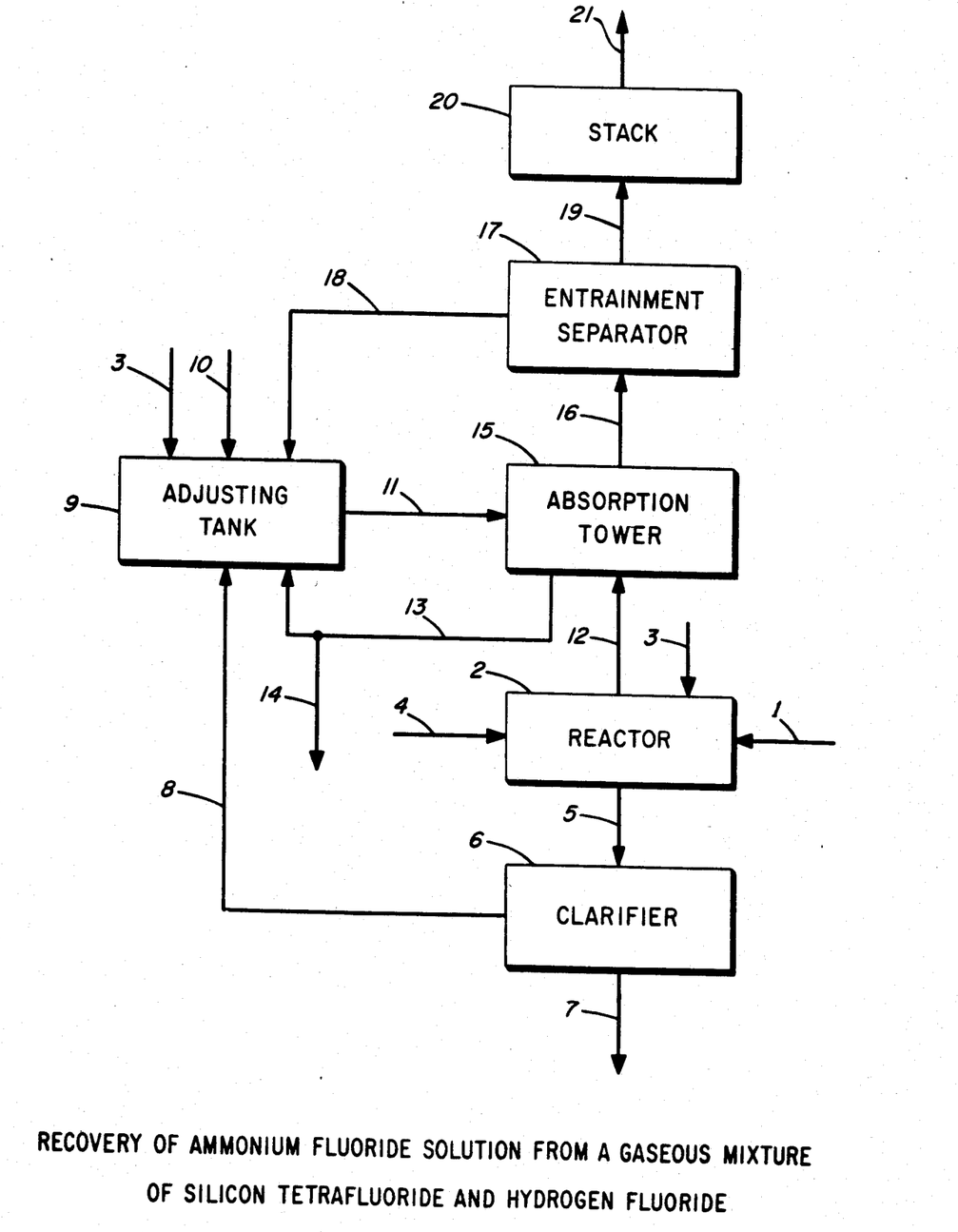

Gases from absorption tower 15 flow through line 16 to entrainment separator 17. Particulates recovered in entrainment separator 17 flow through line 18 to adjusting tank 9. Gases from entrainment separator 17 flow through line 19 to stack 20 and gases 21 are discharged to the atmosphere.

DISCUSSION OF THE PRIOR ART

Much information has been published on the preparation of fluorine compounds suitable for use in the production of aluminum. The compounds are sodium cryolite ($Na_3AlF_6$) and aluminum fluoride ($AlF_3$). The fluosilicic acid recovered at wet-process phosphoric acid plants when filter-grade phosphoric acid is concentrated to merchant-grade acid has long been an attractive source of fluorine for the preparation of sodium cryolite and aluminum fluoride. Many innovative processes have been devised to convert the fluosilicic acid to fluorides and to remove unwanted impurities from the fluoride solutions. Some of the processes have been used commercially.

Many patents and publications are sources of the prior art on making the fluorine chemicals. Two technical articles are reviews with many references, and they provide summaries of the prior art. The technical articles are as follows.

1. "Fluorine Recovery in the Fertilizer Industry—A Review," by H. F. J. Denzinger, H. J. König, and G. E. W. Krüger, Phosphorus and Potassium, No. 103, 33–9, September/October 1979. Article has 203 references.

2. "Processes for Fluorine Recovery in Phosphatic Fertilizer Industry," by S. Sampat, G. P. Mathur, and V. Pachaiyappan, Fertilizer News, 7–17, April 1980. Article has 104 references.

Considerable research was conducted at the TVA National Fertilizer Development Center to develop processes to make saleable fluorine compounds from the fluorine released during the production of phosphate fertilizers. The primary purpose of the TVA work was to produce byproduct fluorine compounds from the fluorine released during the calcining and smelting of phosphate ores. However, only about 50 pounds of fluorine is released per ton of phosphorus produced. The rate of fluorine release when filter-grade phosphoric acid is concentrated to merchant-grade acid is about 101 pounds per ton of $P_2O_5$ in the wet-process phosphoric acid. Processes were developed at TVA to separate fluorine compounds in the waste-waters from the impurities $SiO_2$, $P_2O_5$, and $Fe_2O_3$. All of the impurities must be reduced to small concentrations in sodium cryolite and aluminum fluoride when they are to be used in making aluminum.

The enclosed publication, ▸Fluoride Recovery from Phosphorus Production," by J. C. Barber and Thad D. Farr, Chemical Engineering Progress 66(11), 56–62 (November 1970), gives results of the TVA research. However, the development was unsuccessful because the quantity of fluorine available would not support a commercial undertaking.

Research at TVA on fluid fertilizers revealed that fluorides were beneficial in preventing large crystal growth in orthophosphate suspension fertilizers. The quality of suspension fertilizers is improved when the suspended crystals are small. Wastewater from phosphorus furnace condensers is a source of fluoride salt solution which can be used in suspension fertilizers. The wastewater contains relatively large percentages of ammonium phosphate, but cost of removing the ammonium phosphate from the fluoride solution can be saved if the wastewater is used in suspension fertilizers. The mixture of fluoride salts and ammonium phosphate is utilized in the suspension fertilizer.

U.S. Pat. No. 4,383,847, "Production of Fluid Fertilizer from Phosphorus Furnace Waste Stream," May 17, 1983, discloses processes for recovering phosphorus condenser wastewater in suspension fertilizers. The processes were evaluated in the technical paper entitled "Disposal of Liquid Wastes in By-Product Fluid Fertilizers," which was presented at the American Chemical Society Division of Fertilizer and Soil Chemistry in August 1984. An economic study reported in the paper shows that the recovery of nutrients in the wastewater will save $2.26 per ton of elemental phosphorus. But no monetary credit was taken for the beneficial effect of fluoride in the suspension fertilizers.

Additional processes for recovering condenser waste-water were disclosed in U.S. Pat. No. 4,451,277, "Production of Fluid Fertilizer from Phosphorus Furnace Waste Stream," May 29, 1984. The publication, U.S. patents, and technical paper are cited as prior art in the present application.

At wet-process phosphoric acid plants about 15 pounds of fluorine is emitted at the digester and filter per ton of $P_2O_5$ in the acid produced. The fluorine-containing air is scrubbed with water to remove the fluorine, resulting in the generation of pond water. Fluorine is present as fluosilicic acid, and the pond water contains phosphoric acid. The problem of recovering nutrients and fluorides in the wastewater at wet-process phosphoric acid plants is significantly different from that at phosphorus furnaces.

Solid ammonium phosphate fertilizers are produced at most acid plants, and processes to recover wastewater in the solid fertilizers are more attractive than they are in suspension fertilizers. Results of economic studies reported in "Disposal of Liquid Wastes in By-Product Fluid Fertilizers" show estimated savings of $4.13 per ton of $P_2O_5$ in wet-process phosphoric acid when the wastewater is recovered in suspension fertilizers. This saving is about four times as much as for phosphorus furnace condenser water. When the wastewater is recovered in solid ammonium phosphates the savings are larger than the figure reported in the paper.

The pond water is too dilute for recovery in either suspension fertilizers or solid ammonium phosphate fertilizers. Furthermore, fluosilicic acid must be converted to the fluoride salt to obtain benefits from fluorine compounds in either suspension fertilizer or solid ammonium phosphates. A literature search was conducted to investigate the technology for the treatment of fluorine-containing gases for the separation of fluorine-containing compounds. The pertinent prior art disclosed by the search is given in the following list of publications and patents.

1. "Practical Design of Cross-Flow Scrubbers in the Phosphate Industry," by Craig A. Pflaum, Proceeding Environmental Symposium, The Fertilizer Institute, Mar. 6, 7, 8, 1978, New Orleans, La.

2. "Scrubbers in the Fertilizer Industry—Their Success, Near Future, and Eventual Replacement," by A. J. Teller. Paper was presented at the Fertilizer Industry Round Table, Nov. 8, 1973, Washington, D.C.

3. "New Solutions to Old Fertilizer Problems," by A. J. Teller. Paper was presented at the American Chemical Society Division of Fertilizer and Soil Chemistry, Aug. 29, 1972, New York, N.Y.

4. "Fluoride Emission Control Costs," by T. R. Osag, J. A. Smith, F. L. Bunyard, and B. B. Crane, Chemical Engineering Progress, Volume 72, No. 12, December 1976.

5. "Recovery of Fluorides from Effluent Gases of Superphosphate Plant," by R. Krishnan and M. S. Mahalingam, Fertilizer News, Volume 18, No. 9, September 1973.

6. "Control of Gaseous Fluoride Emissions," by A. J. Teller, Chemical Engineering Progress, Volume 63, No. 3, March 1967.

7. "Packed-Bed Scrubber Modifications Cut Fluorine Emissions," by Kenneth Craig, Chemical Processing, October 1980.

8. "Scrubbers for Phosphoric Acid Plants," by Arthur O. Hansen and Robert J. Danos, Chemical Engineering Progress, Volume 78, No. 3, March 1982.

9. "Purification of Waste Water," U.S. Pat. No. 3,725,265, Apr. 3, 1973.

10. "Removal of Fluorine During Production of Fertilizers," U.S. Pat. No. 4,175,944, Nov. 27, 1979.

11. "Absorbing Fluorine Compounds from Waste Gases," by C. Djololian and D. Billaud, Chemical Engineering Progress, Volume 74, No. 11, November 1978.

EXAMPLE I

Two nodulizing kilns were operated to agglomerate phosphate ore to feed into phosphorus furnaces. The ore was heated to incipient fusion to provide liquid phase for agglomeration. Part of the fluorine in the mineral fluorapatite was volatilized by heating the ore. The F:$P_2O_5$ weight ratio in the ore was reduced from about 0.107 to about 0.08 by heating. Exhaust gases from the two kilns were treated in a fluorine scrubber constructed of wood. Water was used as a scrubbing medium but the water was not recirculated. The fluorine content of the water was in the range of 0.07 to 0.10 percent.

Plastic piping was installed at the fluorine scrubber to permit the water to be recirculated. The pH of the recirculating water was maintained in the range of 5 to 6 by the addition of aqua ammonia. The temperature of the recirculating scrubber water was 149° F.

A 6000-gallon batch of fluorine-containing liquor was prepared by recirculating the scrubbing medium. The composition of the batch of liquor was as follows.

| | |
|---|---|
| Solids | 4.0 percent |
| F | 3.07 percent |
| $SiO_2$ | 1.05 percent |
| $P_2O_5$ | 0.12 percent |
| S | 1.72 percent |
| $Fe_2O_3$ | 0.07 percent |
| $Al_2O_3$ | 0.03 percent |
| CaO | 0.01 percent |
| $K_2O$ | 0.02 percent |

A liquor containing about 5 percent F was desired, but the gas contained a large amount of dust which prevented the preparation of a more concentrated liquor. The $SiO_2$ in the liquor came from silicon tetrafluoride gas. About 40 percent of the fluorine in the kiln gas was in the form of $SiF_4$ and about 60 percent was HF.

EXAMPLE II

The vapor pressure of 7 (calculated as HF), $NH_3$, and $H_2O$ in fluorine scrubber liquor was measured by the transpiration method to determine whether or not the F and $NH_3$ in slightly acidic liquors have significant vapor pressure. The liquor was part of the batch prepared in example I. The vapor pressure measurements were made at 65° C. (149° F.) which was the temperature of the recirculating liquor described in example I, and the pH was about 5.5. Results of the vapor pressure measurements are given in table 2.

TABLE 2

Vapor Pressure of Fluorine Liquor

| Composition of liquor, percent | | | $N_2$ flow rate, ml/minute | Duration of test, min. | Partial pressure, mm Hg | | |
|---|---|---|---|---|---|---|---|
| F | $NH_3$ | $SiO_2$ | | | F | $NH_3$ | $H_2O$ |
| 3.07 | 3.26 | 1.05 | 112 | 240 | 0.05 | 0.08 | — |
| | | | 220 | 225 | 0.03 | 0.04 | 232.4 |
| | | | 428 | 180 | 0.009 | 0.02 | 166.1 |

The data in table 2 show that the fluorine in the nodulizing kiln exhaust gases can be scrubbed out by a slightly acidic solution without significant loss of ammonia in the scrubber exhaust gas. The vapor pressure of water over the scrubber liquor was much greater than that for either F or $NH_3$, and the liquor can be concentrated by evaporation.

EXAMPLE III

The vapor pressure of F (calculated as HF), $NH_3$, and $H_2O$ over fluorine-containing solutions was measured by the transpiration method. The temperature of the solution was 65° C. (149° F.), and the concentration of F in the solution was varied over the range of 2.4 to 9.7 percent. The solutions were slightly acidic. Results of the vapor pressure measurements are given in table 3.

TABLE 3

Vapor Pressure of Fluorine Solution

| Composition of solution, percent | | | $N_2$ flow rate, ml/minute | Duration of test, min. | Partial pressure, mm Hg | | |
|---|---|---|---|---|---|---|---|
| F | $NH_3$ | $SiO_2$ | | | F | $NH_3$ | $H_2O$ |
| 2.43 | 1.80 | 0.92 | 94.7 | 300 | 0.0122 | 0.06 | 171.5 |
| | | | 226.0 | 240 | 0.010 | 0.08 | 166.9 |
| | | | 409.9 | 120 | — | 0.08 | 150.3 |
| 4.87 | 3.60 | 1.74 | 102.7 | 301 | 0.005 | 0.10 | 164.7 |
| | | | 233.6 | 210 | 0.006 | 0.08 | 161.4 |
| | | | 406.3 | 120 | 0.013 | 0.08 | 147.7 |
| 9.73 | 7.20 | 3.67 | 100.1 | 300 | 0.01 | 0.16 | 156.8 |
| | | | 223.0 | 240 | 0.01 | 0.15 | 150.6 |
| | | | 412.0 | 120 | 0.006 | 0.16 | 164.5 |

The vapor pressure of F over the solution remained low over the range of concentrations. The vapor pressure of $NH_3$ increased slightly with increasing concentrations of F, and the vapor pressure of $H_2O$ decreased slightly as the concentration of F increased. Nevertheless, vapor pressure data indicated that the concentration of F in the absorption tower scrubbing medium can be increased to about 10 percent without significant loss of $NH_3$. The vapor pressure of $H_2O$ over the solution was high enough to concentrate the scrubbing medium at a nodulizing kiln fluorine scrubber.

EXAMPLE V

A side stream of exhaust gas from a noduzling kiln was sparged into a bottle containing water. The purpose was to prepare a sample of fluorine-containing liquor for experimentation to remove $P_2O_5$, $SiO_2$, and $Fe_2O_3$. The pH of the water was maintained in the range of 5 to 6 by the addition of aqua ammonia during the time the gas was being sparged in the bottle. When the F concentration in the liquor reached 1.8 percent it was treated with 500 percent of the stoichiometric quantity of ferric sulfate to remove the $P_2O_5$, and the liquor was ammoniated with aqua ammonia to a pH of 8.5 to precipitate silica and iron. Precipitates were removed from the treated liquor by filtering.

Analyses of liquor before and after the purification treatment are given in table 4.

TABLE 4

| Analyses of Fluorine-Containing Liquor | | | | |
|---|---|---|---|---|
| | Analysis, percent | | | |
| | F | $P_2O_5$ | $SiO_2$ | $Fe_2O_3$ |
| Analysis of liquor before purification | 1.80 | 0.19 | — | — |
| Analysis of liquor after purification | 1.48 | 0.004 | 0.004 | <0.001 |

The F:$P_2O_5$ ratio in the purified solution was 368 as compared with a minimum ratio of 460 specified for commercial sodium cryolite. It was assumed that only part of the $P_2O_5$ in the liquor would be precipitated when sodium cryolite is prepared. The sodium cryolite specifications for $SiO_2$ and $Fe_2O_3$ were met in the purified sample.

EXAMPLE V

A sample of the liquor obtained in example I was ammoniated to a pH of 9. Increasing the pH resulted in the precipitation of the following impurities.
96 percent of the $SiO_2$
72 percent of the $Fe_2O_3$
13 percent of the $P_2O_5$
<1 percent of the F

EXAMPLE VI

Nodulized phosphate was smelted in a phosphorus furnace operating at a powerload of 13,400 kW. The gases discharging from the furnace were a mixture containing elemental phosphorus, carbon monoxide, hydrogen, nitrogen, carbon dioxide, and fluorine compounds. An electrostatic precipitator cleaned the gases to remove particulates. The cleaned gases were cooled by contacting them in a vertical, cylindrical chamber with water which was sprayed into the chamber. The purpose of cooling the gases was to condense elemental phosphorus, and the chamber was called a condenser. A spray nozzle was installed at the top of the condenser and eight spray nozzles were installed at two levels around it. The gases entered near the bottom of the condenser and flowed upward to the outlet. The condenser was 5 feet in diameter.

The gases flowed to exhausters downstream from the condenser. Water was recirculated at the condenser and the exhausters which had liquid seals. The pH of the water was maintained at 5.5 by adding a soda ash solution; consequently, a mixture of sodium phosphate, sodium fluoride, sodium fluosilicate, and potassium fluosilicate accumulated in the recirculating water. The gas flow rate was about 2,066,000 cubic feet per day at standard temperature and pressure on a dry, phosphorus-free basis. Gas entering the condenser contained about 697 pounds F per day and the gas leaving the exhausters contained 2 pounds per day, giving a removal efficiency of 99.7 percent.

The phosphorus condensing systems provided excellent absorption of fluorine compounds because the gases are effectively contacted with water. It is necessary to obtain complete saturation of the gas with water for maximum adiabatic cooling and thereby condense maximum quantity of phosphorus. The ratio of scrubber water to gas treated was 0.13 gallon per cubic foot at the condenser inlet (STP). In most fluoride scrubbers the ratio of water to gas is about 0.02 gallon per cubic foot. But the figure of 0.13 gallon of water per cubic foot of gas included water used in the liquid seal exhausters.

It was assumed that the F in the exhaust gas was present as HF. Therefore, about 39 cubic feet of HF was discharged per day. The partial pressure of HF in the exhaust gas was calculated to be 0.015 mm Hg at 152° F. (67° C.), and this figure can be taken as the equilibrium when scrubbers are being designed. In example II the vapor pressure of F over a slightly acidic scrubber solution neutralized with ammonia was about 0.03 mm Hg. The following equilibrium values are applicable for scrubbing gases from phosphate processes containing fluorine compounds.

|  | Equilibrium vapor pressure of F, mm Hg |
|---|---|
| Scrubber water neutralized with sodium compounds | 0.015 |
| Scrubber water neutralized with potassium compounds | 0.015 |
| Scrubber water neutralized with ammonia compounds | 0.030 |

EXAMPLE VII

Unbeneficiated phosphate ore from deposits in Tennessee was agglomerated by compacting and the material was calcined in a combination travelling grate-rotary kiln. The ore was processed at a rate of 55 tons per hour on a dry basis, and the $F:P_2O_5$ weight ratio was 0.111. The ore was heated to 2200° F. resulting in the volatilization of 8 percent of the F. About 75,700 cfm (STP) of gas was discharged from the calciner and the gas contained the volatilized fluorine compounds. The rate of volatilization of F was 4.1 pounds per minute.

Discharged gas was treated in the arrangement of equipment shown in FIG. 1 in the enclosed publication, "Fluoride Recovery from Phosphorus Production," Chemical Engineering Progress, Vol. 66, No. 11, November 1970. The scrubber shown in the figure was 26 feet in diameter and it was equipped with five rings of spray nozzles. Each ring of sprays was designed to cover the cross section of the tower, thereby providing five stages of fluorine absorption. The ratio of scrubber water to flow was 0.018 gallon per cubic foot of gas. Fresh water was sprayed into the scrubber, fluorine compounds and $P_2O_5$ were absorbed, and acidic effluent was discharged without recirculation.

The concentration of HF in the gas at the tower inlet was 972 ppm, taking all the F to be present as HF. The concentration is on a volumetric basis. Ninety-eight percent of the fluorine was recovered in the scrubber and the outlet gas contained 19 ppm of HF. The once-through scrubber water contained about 353 ppm of F on a weight basis. Equilibrium fluorine vapor pressure over the acidic scrubber water such as the once-through scrubber water is unknown. However, the concentration of F in equilibrium with pond water at wet-process phosphoric acid plants has been reported to be about 1.5 ppm, and an equilibrium F concentration of 1.0 ppm was assumed to calculate the number of transfer units at the absorption tower. The number of transfer units was calculated as shown below.

$$N = \text{LN} \frac{Y_1 - Y_a}{Y_2 - Y_a}$$

$N$ = number of transfer units.

$Y_1$ = F concentration in inlet gas.

$Y_a$ = F concentration in equilibrium with scrubber water.

$Y_2$ = F concentration in outlet gas.

$$N = \text{LN} \frac{972 - 1}{19 - 1} = \text{LN } 53.9 = 4 \text{ transfer units.}$$

Fluorine recovery of 98 percent was inadequate to meet air pollution regulations. The F content of the exhaust gases should be reduced to about 5 ppm to provide F recovery of about 99.5 percent. The number of transfer units needed to meet air pollution regulations was calculated to be 5.5. Increased F removal could be obtained by increasing the height of the scrubber and providing additional rings of sprays. Larger quantities of water would be required. This alternative was not attractive because a larger quantity of effluent would be obtained and the effluent treating system would be overloaded.

The absorption efficiency could be improved by packing the absorption tower to provide better contact between the gas and scrubbing medium. This alternative was not attractive becaus experience has shown that sodium and potassium fluosilicate scales deposit in tower packing. The deposits are tenacious scales and the tower packing must be removed for cleaning. Much of the packing is destroyed when the scale is removed.

The air pollution problem was unresolved when agglomeration and calcinination of the phosphate ore was discontinued.

EXAMPLE VIII

The present example shows how the air pollution abatement regulations discussed in example VII can be met. The process of the present example was not carried out as described.

The absorption tower described in example VII was replaced by a combination reactor-absorption tower section followed by an entrainment separator to remove particulates from the gas stream. The gases were then discharged to the atmosphere by a stack.

The calciner gas contained HF and $SiF_4$ and the gas was treated with aqua ammonia in a reactor. The reactor was a spray chamber. Some ammonia vaporized into the gas stream because ammonia has a significant vapor pressure in alkaline solutions. However, the quantity of aqua ammonia used was sufficient to provide a pH in the range of 8.5 to 9.0 in the collected spray water. The HF gas was absorbed in the spray water and reacted with ammonia as shown below.

$$HF + NH_3 = NH_4F.$$

The $SiF_4$ in the gas was absorbed by water in accordance with the following reaction.

$$3SiF_4 + 2H_2O = 2H_2SiF_6 + SiO_2.$$

Fluosilicic acid was formed and $SiO_2$ was precipitated. The fluosilicic acid reacted with ammonia and water in the liquid phase to form ammonium fluoride and precipitate $SiO_2$ as indicated below.

$$H_2SiF_6 + 6NH_3 + 2H_2O = 6NH_4F + SiO_2.$$

The calciner gases contained $P_2O_5$ which resulted from the combustion of byproduct carbon monoxide gas used as fuel. The byproduct gas is obtained when phosphate ores are smelted in electric furnaces and some uncondensed elemental phosphorus remained after the gas was treated in a condensing system. The elemental phosphorus oxidized to $P_2O_5$ when the gas was burned. Aqua ammonia sprayed into the reactor combined with the $P_2O_5$ as indicated by the following equation.

$$4NH_3 + P_2O_5 + 3H_2O = 2(NH_4)_2HPO_4.$$

Diammonium phosphate is formed when the pH is in the range of 8.5 to 9.0. This salt is soluble in water. The liquid in the reactor was a slurry and it contained dissolved ammonium fluoride and diammonium phosphate and $SiO_2$ was present as a solid phase. FIG. 1 in the enclosed publication, "Fluoride Recovery from Phosphorus Production," shows dry dust collectors which were used to remove larger particles of dust from the gas stream. But the small sized particles were not removed from the gas stream. This dust was collected in the reactor and this insoluble material was present in the slurry.

Slurry from the reactor was clarified to separate solids from the solution. The solids, consisting of phosphate dust and precipitated $SiO_2$, were recovered as underflow and this material was disposed of by incorporating it in a process for making orthophosphate suspension fertilizer. The particles were small enough to be suspended by the gelling clay normally used in preparing suspension fertilizers. Solids and liquids were not completely separated by settling, and underflow from the clarifier contained some solution of ammonium fluoride and ammonium phosphate. Nutrients and fluoride salt in the underflow as solution were recovered in the suspension fertilizer.

Ammonia vaporized from the reactor and was recovered by absorption wherein the scrubbing medium was overflow from the clarifier. But the pH of the scrubbing medium was adjusted to 5.5 by adding phosphoric acid to the overflow in an adjusting tank. Heat was generated by the neutralization of alkaline overflow with phosphoric acid, which increased the temperature of the scrubbing medium. Anhydrous ammonia was added to the adjusting tank to increase the temperature to 200° F. Nevertheless, the proportions of ammonia and phosphoric acid used were adjusted so that the pH remained 5.5. At 200° F. the vapor pressure of water is 22 times the vapor pressure at 70° F. and the scrubbing medium is rapidly-concentrated. Steam was discharged from the adjusting tank and water evaporated in the absorption tower.

The gas mixture from the absorption tower was treated in an entrainment separator to remove suspended particles formed as a result of contacting the gas stream with the scrubbing medium in the absorption tower. The liquid collected by the entrainment collector was added to the adjusting tank. The treated gas was discharged to the atmosphere by a stack.

The scrubbing medium was adiabatically cooled in the absorption tower, and the pH of the liquid was increased when ammonia was absorbed. The scrubbing medium was recirculated to the adjusting tank, but a stream of the liquid containing 5 percent F was bled off.

The fluorine was present as ammonium fluoride and the phosphorus was present as ammonium phosphate. Therefore, bleedoff from the recirculating scrubbing medium had the following characteristics.

1. Nutrients in the bleedoff could be recovered in suspension fertilizers. Heretofore $P_2O_5$ from the combustion of byproduct carbon monoxide gas was unrecovered.
2. Ammonium fluoride dissolved in the bleedoff could be used to prevent the growth of large crystals in suspension fertilizers.
3. Water in bleedoff could be used to replace water normally used to prepare suspension fertilizers.

EXAMPLE IX

Fluorine-containing gases at wet-process phosphoric acid plants have not been treated as described in the present example. However, calculations and cost estimates were made to investigate the feasibility of recovering liquid waste generated at wet-process phosphoric acid plants. The technical paper, "Disposal of Liquid Wastes in By-Product Fluid Fertilizers," gives results of the calculations and cost estimates, and these results explain how the invention can be applied. Much of the present example was taken from the technical paper.

It is proposed to treat the fluorine-containing gases by a process similar to that described in example VIII. An ammonium fluoride salt solution is obtained by treating the gas with aqua ammonia at a pH of 8.5 to 9.0; pH of the solution is adjusted to the range of 5.5 to 6.0 by the addition of phosphoric acid, and the solution is used as a scrubbing medium in an absorption tower. The temperature of the scrubbing medium is increased to concentrate the solution wherein vapor pressure of water is high but vapor pressures of F and $NH_3$ are not significantly increased. Vapor pressure data show that the concentration of F in the scrubbing medium can be increased to the range of 5 to 10 percent. An F concentration of 5 percent was taken for the publication, "Disposal of Liquid Wastes in By-Product Fluid Fertilizers."

Suspension fertilizer can be made by dissolving monoammonium phosphate (MAP) fertilizer in the absorption tower bleedoff. The present example explains the technology for making 11-33-0 suspension from 11-52-0 MAP. The 11-33-0 suspension fertilizer is made commercially by dissolving MAP in water. Ammonia is added to raise the temperature of the mixture and increase the rate of solution because ammonia reacts with MAP to generate heat. The usual formulation for making the 11-33-0 suspension fertilizer is given in table 5.

TABLE 5

| Formulation for Making 11-33-0 Suspension Fertilizer from MAP | |
|---|---|
| | Pounds per ton of 11-33-0 |
| MAP (11-52-0) | 1269 |
| Anhydrous ammonia | 97 |
| Water | 604 |
| Gelling clay | 30 |
| Total | 2000 |

In accordance with disclosures in the present application, water shown in the formulation is replaced by bleedoff. The bleedoff contains ammonium fluoride and ammonium phosphate salts in an aqueous solution and the salts are recovered in the suspension fertilizer. Part of the phosphorus in ammonium phosphate is derived from fumes collected at the digester and filter in the wet-process phosphoric acid process. Also, part of the phosphorus in the salt is derived from cleanout of equipment, such as washouts of the digester, filter, and phosphoric acid storage tanks. Heretofore scrubber water, which was called pond water, was wasted and the combined phosphorus in the water was lost. The phosphorus values are recovered when the bleedoff is used to make suspension fertilizers.

Some of the combined phosphorus in the bleedoff water is derived from phosphoric acid added to the adjusting tank to control the pH and acid is added to combine with ammonia and thereby increase the temperature of the scrubbing medium. This phosphoric acid has the same value as the phosphoric acid used in making MAP fertilizer. Therefore no net cost is incurred by adding phosphoric acid to the adjusting tank. Ammonia is used in the adjusting tank but no net cost is incurred because the value of this ammonia is the same as that used in making MAP.

Commercial MAP fertilizer is an impure chemical which contains iron and aluminum. When 11-33-0 suspension fertilizer is made from it, iron and aluminum compounds precipitate as amorphous gels. The precipitated compounds can be represented by the formula, $(Fe,Al)PO_4 \cdot nH_2O$. The gels entrap and bind free water, and they cause progressive increases in viscosity of the suspension fertilizer, which is an undesirable characteristic. The suspension fertilizer may solidify, resulting in a short shelf life. In some cases 11-33-0 suspension fertilizer can be stored only about a week, whereas 3 months' storage is needed.

The $(Fe,Al)PO_4 \cdot nH_2O$ gels in 11-33-0 are formed from the compounds represented by the formula, $(Fe,Al)NH_4(HPO_4)_2$. When MAP contains fluoride salts the viscosity of the 11-33-0 suspension is decreased and the fertilizer can be stored longer. Iron and aluminum impurities in MAP combine as the compounds, $(Fe,Al)NH_4HPO_4F_2$, when fluoride salts are present. The quality of the 11-33-0 suspension fertilizer is markedly improved when it is made from MAP containing fluoride salts.

Research at the TVA National Fertilizer Development Center disclosed the chemistry of the reactions that occur when 11-33-0 suspension fertilizer is produced from the impure commercial grades of MAP. The TVA research was reported in "New Developments in Fertilizer Technology," 14th Demonostration, Oct. 5-6, 1983, Tennessee Valley Authority, Muscle Shoals, Ala.

Map is dissolved in water to make 9-27-0 and 10-30-0 suspension fertilizers. The adverse effects of iron and aluminum compounds on these lower grades are not so pronounced as in 11-33-0. However, 11-33-0 contains 22 percent more nutrients than does 9-27-0, and 10 percent more nutrients than 10-30-0. Fluoride salts are added to MAP to obtain savings from distribution of the higher analyses suspension fertilizers.

EXAMPLE X

The present example is based on information in the enclosed paper, "Disposal of Liquid Wastes in By-Product Fluid Fertilizers."

Wet-process phosphoric acid was produced at a rate of 500 tons of $P_2O_5$ per day. Fluorine compounds were discharged into the air at the digester and filter. The air containing the fluorine compounds was treated in accordance with the process described in example VIII. Bleedoff from the scrubbing medium used in the absorption tower was assumed to contain 5 percent F.

The bleedoff was used to make 13-38-0 orthophosphate suspension fertilizer wherein water in the bleedoff provided the water required in the fertilizer process. The quantity of bleedoff was 75 tons per day and it contained sufficient water to produce 71,000 tons of suspension fertilizer 13-38-0 per year. The market price of the suspension fertilizer was $194 per ton and the estimated cost of making this fertilizer when all of the chemicals were purchased was $157 per ton. The difference—$37 per ton—was taken to be the cost of marketing.

Part of the phosphorus combined as ammonium phosphate in the bleedoff was derived from collected fumes and equipment washouts as explained in example IX. Heretofore the combined phosphorus derived from these sources was wasted, and recovery of bleedoff in 13-38-0 suspension fertilizer resulted in a saving during the production of wet-process phorphoric acid. Less phosphoric acid was required to make suspension fertilizer. Therefore, cost of producing wet-process phosphoric acid was reduced $4.13 per ton of $P_2O_5$ in the acid according to cost estimates in the paper, "Disposal of Liquid Wastes in By-Product Fluid Fertilizers." U.S. production of wet-process phosphoric acid is about 10,900,000 tons $P_2O_5$ per year. Annual savings from the recovery of bleedoff at all the plants will be about $45 million.

EXAMPLE XI

In this example, bleedoff from fluorine absorption is used to make granular ammonium phosphate fertilizers and these fertilizers are dissolved in bleedoff to make suspension fertilizers. However, the process has not been carried out in practice as described.

Fluorine-laden air from wet-process phosphoric acid production was treated as described in example VIII. The wet-process phosphoric acid plant had a capacity of 500 tons of $P_2O_5$ per day. Bleedoff from the recirculating scrubbing medium contained 5 percent F.

A preneutraliser was constructed at a cost of $330,000. Bleedoff from the recirculating scrubbing medium, merchant-grade wet-process phosphoric acid, and anhydrous ammonia were fed to the preneutralizer.

Mixture from the preneutralizer was pumped to a drum granulator wherein neutralization of the phosphoric acid was completed by the addition of ammonia. Granulated ammonium phosphate was dried in a rotary dryer.

When granular MAP fertilizer was prepared, the solid material was dissolved in bleedoff, ammonia was added, and the mixture was agitated. A gelling clay was added and the mixture was further agitated. The material was pumped to storage tanks for use as a suspension fertilizer. The grades of fertilizers produced were 9-27-0, 10-30-0, and 11-33-0.

A similar procedure was used to produce granular diammonium phosphate (DAP) fertilizer. The DAP was dissolved in bleedoff, phosphoric acid was added, and the acid was neutralized with ammonia. The mixture was agitated. A gelling clay was added and the mixture was further agitated after which the material was pumped to storage tanks for use as a suspension fertilizer. The grades produced were the same as for MAP—9-27-0, 10-30-0, and 11-33-0.

EXAMPLE XII

Granular ammonium phosphate fertilizer was produced as described in example XI. Part of the granular material was distributed for use in preparing blended fertilizer mixtures and part of it was distributed for use in direct application on agricultural land. Nutrients in the scrubbing medium bleedoff were recovered in the granular ammonium phosphate fertilizer.

Some of the granular ammonium phosphate produced as described in example XI was shipped to fertilizer-consuming areas for conversion into base suspension fertilizers within the consuming areas. Cost of shipping water to the fertilizer-consuming areas was thereby avoided. The granular ammonium phosphates contained fluoride salt as a result of the use of bleedoff in making the granular material. The grade of suspension fertilizer produced was 11-33-0. The 11-33-0 contained small sized ammonium phosphate crystals in suspension and the material had an acceptable shelf life. The good quality of the 11-33-0 was caused by the presence of ammonium fluoride in the granular ammonium phosphate.

The 11-33-0 suspension fertilizer was made by dissolving granular ammonium phosphate in water because bleedoff was not available in the fertilizer-consuming areas. The formulation for preparing 11-33-0 from MAP was given in table 5 in example IX. Formulation for making 11-33-0 from DAP is given in table 6.

TABLE 6

| Formulation for Making 11-33-0 Suspension Fertilizer from DAP | |
|---|---|
| | Pounds per ton of 11-33-0 |
| DAP (18-46-0) | 1004 |
| Phosphoric acid (54% $P_2O_5$) | 367 |
| Anhydrous ammonia | 47 |
| Water | 552 |
| Gelling clay | 30 |
| Total | 2000 |

Following are claims for the present invention.
I claim:

1. A process for the production of wet-process phosphoric acid comprised of the following steps:
   (a) digesting ground phosphate ore with sulfuric acid;
   (b) filtering slurry from step (a);
   (c) discarding filter cake from step (b);
   (d) collecting filtrate from step (b) and recovering said filtrate as filter-grade wet-process phosphoric acid;
   (e) collecting fluorine-laden air from digestion and filtration in steps (a) and (b);
   (f) treating fluorine-laden air from step (e) with an aqueous alkaline substance;
   (g) precipitating silica from aqueous mixture formed in step (f);
   (h) separating silica precipitated in step (g);
   (i) discarding silica separated in step (h);
   (j) pumping clarified solution prepared in step (h) to a vessel;
   (k) adding an acid substance to vessel in step (j);
   (l) adding an alkaline substance to vessel in step (j);
   (m) treating air from step (f) in an absorption tower wherein solution from step (j) is the scrubbing medium;
   (n) recycling solution from absorption tower in step (m) to vessel in step (j);
   (o) bleeding off a stream of solution from step (n);
   (p) treating air from step (m) in an entrainment separator;
   (q) adding collected entrained material from step (p) to vessel in step (j);
   (r) discharging air from step (p) to the atmosphere;
   (s) adding bleedoff from step (o) to process for making orthophosphate suspension fertilizer;
   (t) concentrating filter-grade wet-process phosphoric acid from step (d) in a vacuum evaporator; and
   (u) collecting concentrated filtrate in step (t) as merchant-grade wet-process phosphoric acid.

2. The process of claim 1 wherein fluorine-laden air in step (f) is treated with an aqueous alkaline substance and resulting aqueous mixture has a pH in the range of 8.5 to 9.0.

3. The process of claim 1 wherein aqueous alkaline substance in step (f) is taken from the group anhydrous ammonia, aqua ammonia, potassium carbonate, and potassium hydroxide.

4. The process of claim 1 wherein silica in step (i) is recovered as a byproduct.

5. The process of claim 1 wherein acid substance in step (k) is filter-grade wet-process phosphoric acid from step (d).

6. The process of claim 1 wherein acid substance in step (k) is merchant-grade wet-process phosphoric acid from step (u).

7. The process of claim 1 wherein alkaline substance in step (l) is taken from the group anhydrous ammonia, aqua ammonia, potassium carbonate, and potassium hydroxide.

8. The process of claim 1 wherein pH of scrubbing medium in step (m) is in the range of 5.5 to 6.0.

9. The process of claim 1 wherein temperature of scrubbing medium in step (m) is in the range of 70° to 200° F.

10. The process of claim 1 wherein fluorine-free air is added to absorption tower in step (m).

11. The process of claim 1 wherein absorption tower in step (m) is packed.

12. The process of claim 1 wherein phosphate ore is digested with sulfuric acid in step (a) in a vacuum reactor.

13. The process of claim 1 wherein the entrainment separator in step (p) is a packed tower section.

14. The process of claim 1 wherein bleedoff solution in step (o) contains 5 to 10 percent F.

* * * * *